United States Patent
Bradley et al.

(10) Patent No.: US 9,372,320 B2
(45) Date of Patent: Jun. 21, 2016

(54) DATACENTER CONNECTOR SYSTEMS UTILIZING FEED-THROUGH OPTICAL CABLE ASSEMBLIES

(71) Applicant: Corning Cable Systems LLC, Hickory, NC (US)

(72) Inventors: Mark Alan Bradley, Hickory, NC (US); Micah Colen Isenhour, Lincolnton, NC (US); Dennis Michael Knecht, Hickory, NC (US); James Phillip Luther, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 61 days.

(21) Appl. No.: 13/906,749

(22) Filed: May 31, 2013

(65) Prior Publication Data
US 2014/0355943 A1    Dec. 4, 2014

(51) Int. Cl.
*G02B 6/42* (2006.01)
*G02B 6/44* (2006.01)
*G02B 6/38* (2006.01)

(52) U.S. Cl.
CPC ............ *G02B 6/4452* (2013.01); *G02B 6/3885* (2013.01); *G02B 6/3897* (2013.01); *G02B 6/4206* (2013.01); *G02B 6/4214* (2013.01); *G02B 6/4292* (2013.01); *G02B 6/4471* (2013.01)

(58) Field of Classification Search
CPC ... G02B 6/4452; G02B 6/3897; G02B 6/3885
See application file for complete search history.

(56) References Cited

U.S. PATENT DOCUMENTS

| 7,146,090 B2 | 12/2006 | Vo et al. ........................ 385/138 |
| 2003/0021555 A1* | 1/2003 | Toth ..................... G02B 6/4428 385/100 |
| 2005/0041926 A1* | 2/2005 | Elkins et al. .................... 385/53 |
| 2005/0281509 A1* | 12/2005 | Cox ..................... G02B 6/3825 385/59 |

(Continued)

FOREIGN PATENT DOCUMENTS

| CN | 101111790 | 1/2008 |
| CN | 101449189 | 6/2009 |

(Continued)

OTHER PUBLICATIONS

CN Search Report, issued in corresponding CN application, 2014102402875, dated Aug. 12, 2015.
CN Office Action, issued in corresponding CN application, 201410240287, dated Aug. 27, 2015.

*Primary Examiner* — Ryan Lepisto
*Assistant Examiner* — Mary A El Shammaa

(57) ABSTRACT

Datacenter connection systems for use in datacenter enclosures are disclosed. In one embodiment, a datacenter connection system includes a first module and a feed-through optical cable assembly. The first module includes a first faceplate having at least one first feed-through opening, a first surface, and at least one first module connector disposed on the first surface. The feed-through optical cable assembly includes an optical cable having at least one optical fiber, a first feed-through attach member coupled to the optical cable, and a first optical connector coupled to a first end portion of the at least one optical fiber. The at least one optical fiber passes through the first feed-through attach member, and the first feed-through attach member is disposed within the at least one first feed-through opening. The first optical connector is coupled to the at least one first module connector.

20 Claims, 12 Drawing Sheets

(56) References Cited

U.S. PATENT DOCUMENTS

2010/0247052 A1* 9/2010 Berglund ............ G02B 6/4466
385/135
2011/0013414 A1* 1/2011 Smithson ............ G02B 6/0006
362/554

FOREIGN PATENT DOCUMENTS

| CN | 102100010 | 6/2011 |
| CN | 102236141 | 11/2011 |
| CN | 1325498 | 12/2011 |

* cited by examiner

DATACENTER CONNECTOR SYSTEMS UTILIZING FEED-THROUGH OPTICAL CABLE ASSEMBLIES

BACKGROUND

The disclosure relates generally to optical connection between modules in a datacenter enclosure and, more particularly, to datacenter connector systems using feed-through optical cable assemblies which may be used to optically couple modules within datacenter enclosures.

SUMMARY

Embodiments of the present disclosure are directed to feed-through optical cable assemblies and datacenter connection systems having feed-through attach members. Datacenters are computer systems and related components that facilitate telecommunications systems and data storage systems (i.e., "cloud" computing). Datacenters may include rack-based enclosures that maintain several modules that may be communicatively coupled by optical cable jumpers within the enclosure. Several optical connections may be needed to optically connect a first module to a second module. Embodiments of the present disclosure reduce the total number of optical connections needed to communicatively couple modules within a datacenter enclosure by the use of feed-through attach members. The feed-through attach members allow for optical fibers to be passed through faceplates of modules within the datacenter enclosure without requiring optical connectors into and out of the faceplates. Accordingly, embodiments of the present disclosure provide for datacenter connection systems that reduce the total number of optical connectors required to connect modules within the datacenter enclosure, and therefore reduce the loss of optical signals between connected modules.

One embodiment of the disclosure relates to a datacenter connection system including a first module and a feed-through optical cable assembly. The first module includes a first faceplate having at least one first feed-through opening, a first surface, and at least one first module connector disposed on the first surface. The feed-through optical cable assembly includes an optical cable having at least one optical fiber, a first feed-through attach member coupled to the optical cable, and a first optical connector coupled to a first end portion of the at least one optical fiber. The at least one optical fiber passes through the first feed-through attach member, and the first feed-through attach member is disposed within the at least one first feed-through opening. The first optical connector is coupled to the at least one first module connector.

An additional embodiment of the disclosure relates to a datacenter connection system including a first module, a second module, and a feed-through optical cable assembly that couples the first module to the second module. The first module includes a first faceplate having at least one first feed-through opening, a first surface, and at least one first module connector disposed on the first surface. The second module includes a second faceplate having at least one second feed-through opening, a second surface, and at least one second module connector disposed on the second surface. The feed-through optical cable assembly includes an optical cable including at least one optical fiber and having a first end and a second end. The feed-through optical cable assembly further includes first and second feed-through attach members coupled to the first and the second ends of the optical cable, respectively. The at least one optical fiber passes through both the first and second feed-through attach members. The first feed-through attach member is maintained within the at least one first feed-through opening by at least one first engagement feature provided on the first feed-through attach member. The second feed-through attach member is maintained within the at least one second feed-through opening by at least one second engagement feature provided on the second feed-through attach member. The feed-through optical cable assembly further includes a first optical connector having a first mating face, wherein the first optical connector is coupled to a first end portion of the at least one optical fiber such that a first fiber end of the at least one optical fiber is positioned at the first mating face, and a second optical connector having a second mating face, wherein the second optical connector is coupled to a second end portion of the at least one optical fiber such that a second fiber end of the at least one optical fiber is positioned at the second mating face.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments of the present disclosure are generally directed to fiber optic cable assemblies that may be used as optical jumpers to optically connect modules within a datacenter enclosure. As data communications speeds increase, optical datacenters become more attractive due to extremely wide bandwidth and low noise operation. Optical cable assemblies are often used in datacenter enclosures (i.e., a rack-based datacenter enclosure) to provide optical connections between various modules. Modules within a datacenter may include, but are not limited to, server computing devices and routing devices. For example, a first module may be configured as a rack-based server that is optically coupled to a second module that is configured as a rack-based router device via several optical connections.

Typically, four optical connections are required to optically couple a first module to a second module within the datacenter enclosure. Each module includes a first optical connector provided on a circuit board or other substrate, and a "patch panel" connector that is provided within a faceplate. A first fiber optic cable is connected to the first optical connector disposed on the circuit board and to the interior surface optical connector of the patch panel connector. An optical "jumper" cable connects to the patch panel connector of the two interconnected modules (i.e., connected to first and second patch panel connectors). A second fiber optic cable is connected to the second patch panel connector and to a second optical connector within the second module. Accordingly, four optical connections are required to optically couple components of a first module to components of a second module within a datacenter enclosure. Each optical connection presents optical loss of optical signals passing therethrough, which may reduce the ability of optical data communication from successfully being transmitted and received between two inter-connected modules.

Embodiments of the present disclosure reduce the number of optical connections required to optically couple two modules within a datacenter by the use of feed-through attach member assemblies disposed in the faceplates of modules within the datacenter. More specifically, optical fibers are passed through the faceplates of modules without requiring mechanical optical connections by the use of feed-through attach members. Therefore, only two optical connections are needed: one at the circuit board (or other interior location) of each module. By reducing the number of optical connections required to connect modules together, optical loss is reduced, and the cost to implement inter-module optical connections is also reduced. Various embodiments of feed-through optical cable assemblies and datacenter connection systems are described in detail below.

Figure 1:
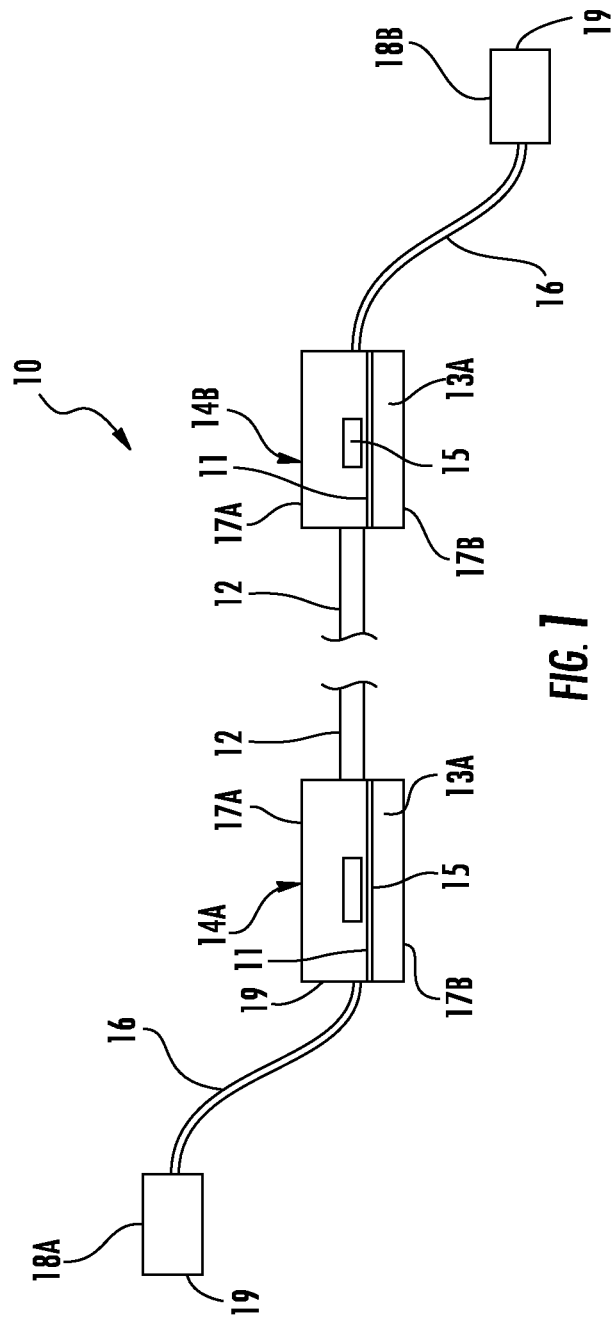
FIG. 1 is a side view of an exemplary feed-through optical cable assembly according to one or more embodiments described and illustrated herein.
Figure 2:
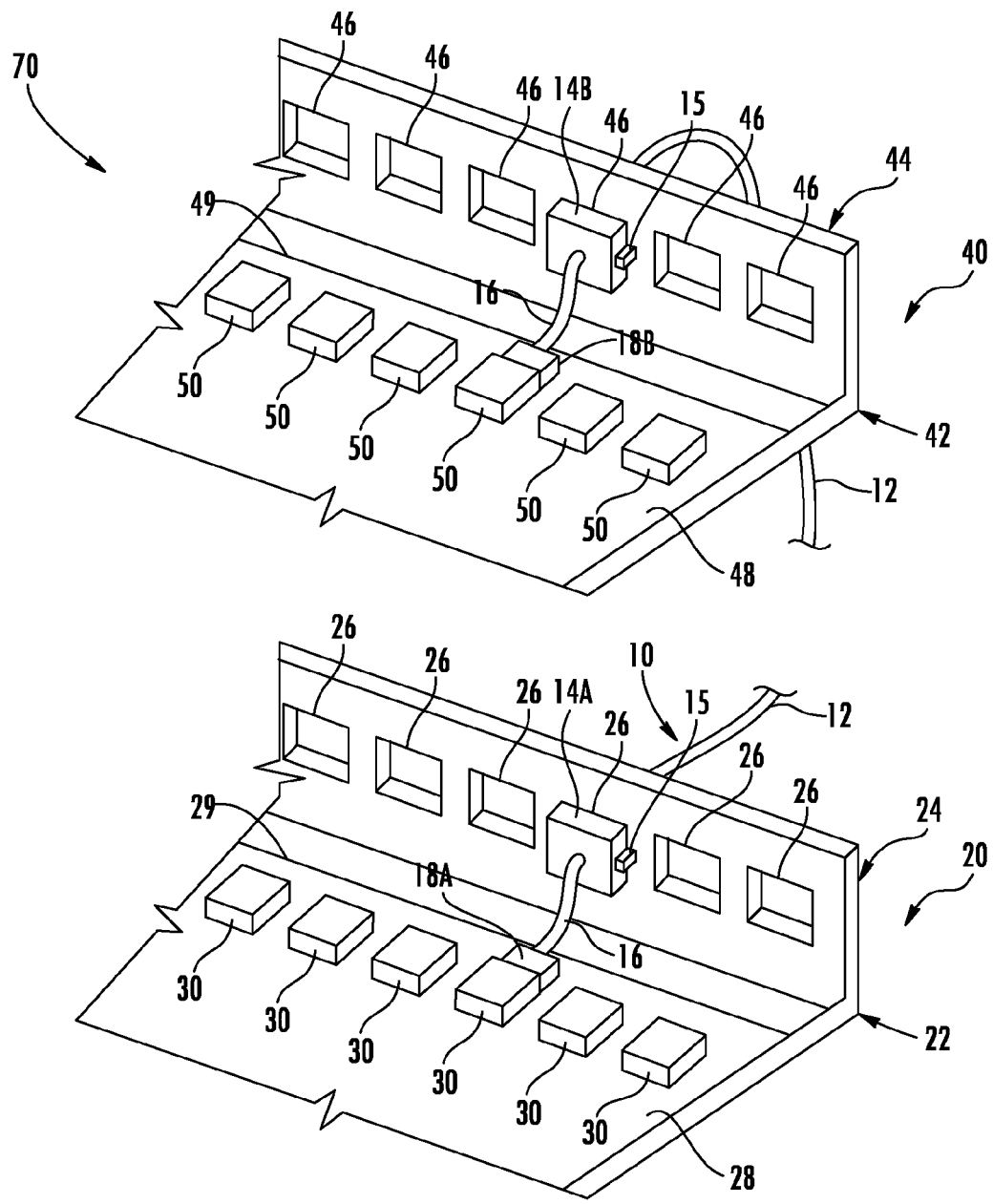
FIG. 2 is a perspective view of an exemplary datacenter connection system including first and second modules within a datacenter enclosure coupled by a feed-through optical cable assembly according to one or more embodiments described and illustrated herein.

FIG. 1 schematically depicts an exemplary feed-through optical cable assembly 10, while FIG. 2 schematically depicts the feed-through optical cable assembly connected to a first module 20 and a second module 40 within a datacenter enclosure that may be used in telecommunications or data storage systems. Referring initially to FIG. 1, the illustrated feed-through optical cable assembly 10 generally includes an optical cable 12 having a length, a first feed-through attach member 14A coupled to a first end of the optical cable 12, and a second feed-through attach member 14B coupled to a second end of the optical cable 12. The optical cable 12 includes at least one optical fiber 16 disposed within a jacket or other outer covering. In other embodiments, the optical cable 12 does not include a jacket such that the at least one optical fiber 16 is exposed between the first and second feed-through attach members 14A, 14B. As an example and not a limitation, the optical cable 12 may include eight optical fibers 16, each of which may have an outer coating, for example. For example, the optical fibers 16 may be ribbonized, or individual loose optical fibers. The optical fiber(s) 16 passes through the first and second feed-through attach members 14A, 14B without interruption, i.e., no optical connectors are provided within the first and second feed-through attach members 14A, 14B.

The first and second feed-through attach members 14A, 14B are configured to be disposed within a faceplate of first and second modules 20, 40. Accordingly, in some embodiments, the first and/or second feed-through attach member 14A, 14B may include one or more engagement features 15 to maintain the first and/or second feed-through attach member 14A, 14B with respect to the faceplates. Various engagement feature configurations are described below with respect to FIGS. 2 and 4A-4C.

The feed-through optical cable assembly 10 further includes a first optical connector 18A coupled to a first end portion of the optical fiber(s) 16 and a second optical connector 18B coupled to a second end portion of the optical fiber(s) 16. As shown in FIG. 2 and described in detail below, the first and second optical connectors 18A, 18B are connected to first and second module connectors 30, 50 within first and second modules 20, 40, respectively.

The first and second optical connectors 18A, 18B may be configured as any optical connector capable of connecting to a module connector within the various modules provided in the datacenter enclosure. In one embodiment, a fiber end 29 of each optical fiber 16 is planar (or nearly planar) with respect to a mating face 19 of the first and second optical connectors 18A, 18B (see FIG. 5). In other embodiments, one or more fiber stubs or waveguides may be disposed within the first and/or second optical connectors 18A, 18B and coupled to the optical fibers 16.

Although the feed-through optical cable assembly 10 is depicted in FIG. 1 as having a pair of feed-through attach members and a pair of optical connectors, embodiments are not limited thereto. For example, in one embodiment a feed-through optical cable assembly may include only one feed-through attach member and only one optical connector such that the opposing end of the feed-through optical cable assembly is hardwired or otherwise provided within the datacenter. Other configurations are also possible.

Referring now to FIG. 2, a first module 20 and a second module provided in a datacenter enclosure 70 is schematically depicted. The first module 20 is optically coupled to the second module 40 by the feed-through optical cable assembly as shown in FIG. 1, thereby defining a datacenter connection system. The first module 20 and the second module 40 may be configured as racks that are disposed in a rack-based datacenter enclosure 70. As an example and not a limitation, the first module 20 may be configured as a server device that is disposed in a rack, which the second module 40 may be configured as a router device disposed in a rack and configured to receive optical communication from the first module and further route or switch such optical communication to downstream and upstream devices.

Figure 5:
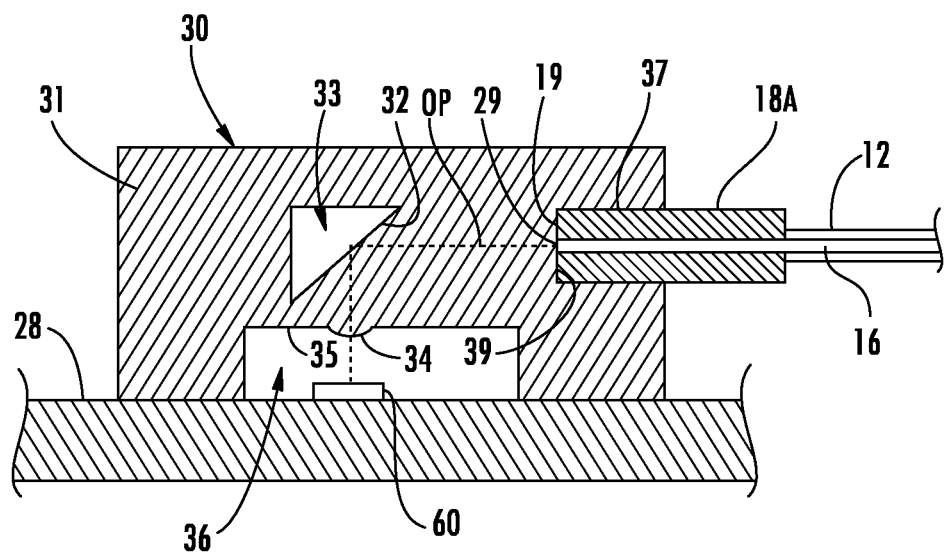
FIG. 5 is a cross-section view of an optical connector of a feed-through optical cable assembly coupled to a module connector of a module within a datacenter enclosure according to one or more embodiments described and illustrated herein.

The first and second modules 20, 40 may be disposed in conventional racks, may have any suitable footprint such as a 1U space, 2U space, 4U space, and the like. As shown in FIG. 2, the first module 20 includes a housing 22 that supports a first surface 28 (e.g., provided by a circuit board or other substrate) and provides a faceplate 24 having feed-through openings 26 configured to receive first feed-through attach members 14A of feed-through optical cable assemblies 10. Any number of feed-through openings 26 may be provided. The first surface 28 of the first module 20 supports electrical, optical and electro-optical components according to the device provided by the first module (e.g., a server device, a router device, and the like). A plurality of first module connectors 30 is also located on the first surface 28. The number of first module connectors 30 may depend on the number of feed-through openings 26. Each first module connector 30 is associated with one or more active optical components 60 (see FIG. 5) that transmit or receive optical signals of light over the one or more optical fibers 16 of the feed-through optical cable assemblies 10. As shown in FIG. 5 and described in more detail below, the first module connector 30 may be positioned over one or more active optical components 60 (e.g., semiconductor devices such as laser diode devices, (e.g., vertical-cavity, surface-emitting lasers), and photodetector devices (e.g., photodiodes)) to optically couple the one or more active optical components 60 to the one or more optical fibers 16.

Similarly, the second module 40 includes a housing 42 that supports a second surface 48 and provides a faceplate 44 also having second feed-through openings 46 configured to receive second feed-through attach members 14B of feed-through optical cable assemblies 10. Any number of second feed-through openings 46 may be provided. The second surface 48 of the second module 40 supports electrical, optical and electro-optical components according to the device provided by the second module 40 (e.g., a server device, a router device, and the like). A plurality of second module connectors 50 is also located on the second surface 48. The number of second module connectors 50 may depend on the number of second feed-through openings 46. As described above with respect to the first module 20, each second module connector 50 is associated with one or more active optical components 60.

One or more feed-through optical cable assemblies 10 may be provided to optically couple active optical components associated with one or more first module connectors 30 of a first module 20 to active optical components associated with one or more second module connectors 50. The feed-through optical cable assembly 10 provides for only two optical connections between a first module connector 30 and a second module connector 50.

A first feed-through attach member 14A of the feed-through optical cable assembly 10 is disposed within an individual first feed-through opening 26 of the first faceplate 24 of the first module 20. Similarly, a second feed-through attach member 14B of the feed-through optical cable assembly 10 is disposed within an individual second feed-through opening 46 of the second faceplate 44 of the second module 40. Accordingly, the first and second feed-through attach members 14A, 14B are operable to pass the optical fibers 16 through the first and second faceplates 24, 44, respectively.

Figure 3:
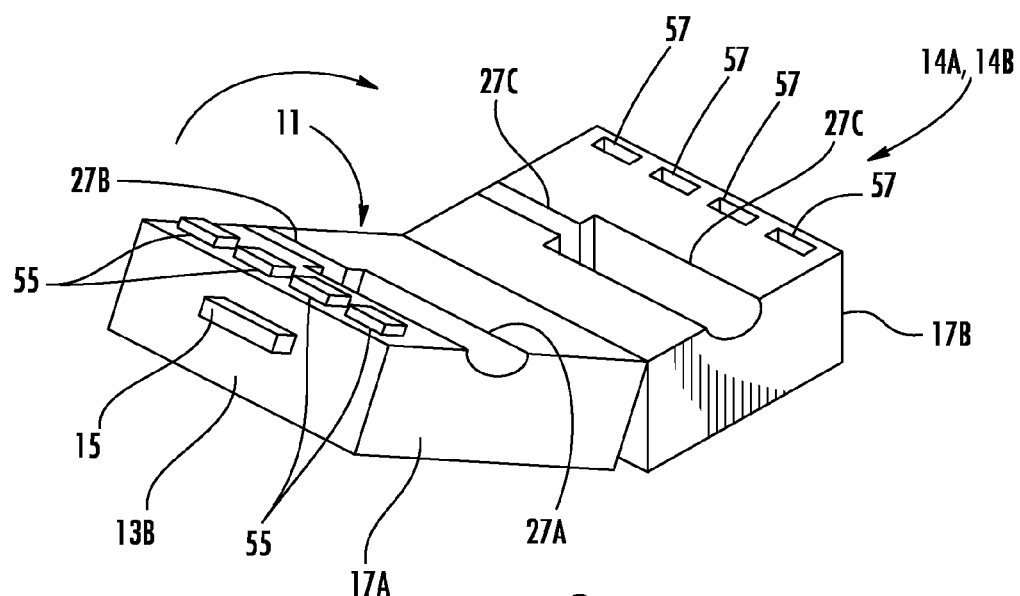
FIG. 3 is a perspective view of an exemplary hinged feed-through attach member in an opened position according to one or more embodiments described and illustrated herein.

The optical fibers 16 may be tightly or loosely maintained within the first and second feed-through attach members 14A, 14B. Referring once again to FIG. 1, in some embodiments, the first feed-through attach member 14A and/or the second feed-through attach member 14B may include a first half portion 17A and a second half portion 17B that are separated by a hinge portion 11. The hinge portion 11 may be provided to easily position the one or more optical fibers 16 within the first and/or second feed-through attach members 14A, 14B. FIG. 3 depicts an exemplary first or second feed-through attach member 14A, 14B having a first half portion 17A that rotates about the hinge portion 11 toward the second half portion 17B to enclose the one or more optical fibers. In embodiments, the first half portion 17A may include a first groove 27A having a dimension to receive a jacketed optical cable 12, and a second groove 27C having a dimension to receive one or more optical fibers 16. Similarly, the second portion may include a corresponding first groove 27B and a corresponding second groove 27D such that the optical cable 12 and the optical fibers 16 are enclosed and tightly maintained by the respective grooves 27A-27D when the first half portion 17A is secured to the second half portion 17B. Any number of grooves may be provided in any configuration, depending on the optical cable 12 and the optical fibers 16. In other embodiments, the optical cable 12 and the optical fibers 16 are not maintained within grooves but rather loosely maintained within the first feed-through attach member 14A and/or the second feed-through attach member 14B.

In embodiments, the first and second half 17A, 17B each include first and second locking features 55, 57, respectively. The example first and second locking features 55, 57 depicted in FIG. 3 are configured to mate with one another to lock the first half 17A of the first or second feed-through attach members 14A, 14B together. In the illustrated embodiment, the second locking features 55 are configured as openings that accept the first locking features 55 configured as tabs. Any number of locking features may be provided in any configuration. Accordingly, embodiments are not limited to the number, arrangement and configuration of the first and second locking features 55, 57 depicted in FIG. 3. Alternatively, no locking features may be provided. In such embodiments, adhesive may be used to secure the first half 17A to the second half 17B. In other embodiments, no hinge portion is provided such that the optical fibers are slid into the first and second feed-through attach members 14A, 14B, which may be held by an interference fit with respect to the optical fibers. In still yet other embodiments, the first and second feed-through attach members 14A, 14B may be molded over the optical cable and/or the optical fibers 16 to provide overmold such that the first and second feed-through attach members are configured as overmold components.

As stated above, engagement features 15 may be provided on the first and/or second feed-through attach members 14A, 14B to connect the first and/or second feed-through attach members 14A, 14B to faceplates within a datacenter enclosure (e.g., as shown in FIG. 2 and described above). The first and/or second feed-through attach members 14A, 14B may be permanently or removably coupled to a faceplate. The first and second feed-through attach members 14A, 14B are operable to be connected to the faceplates of the modules within the datacenter enclosure without corresponding mating connectors or receptacles disposed on the faceplates. However, such mating connectors or receptacles may be provided on the faceplates for receiving the first and/or second feed-through attach members 14A, 14B if desired.

Figure 4:
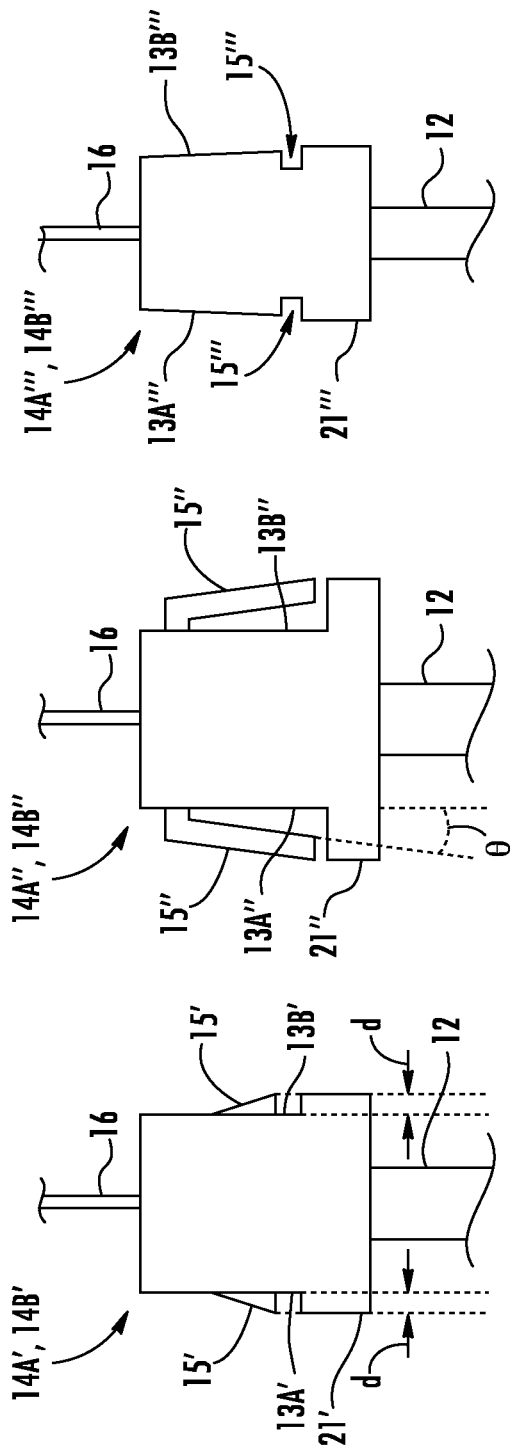
FIG. 4A is a top-down view of an exemplary feed-through attach member having engagement features configured as angled tabs.
FIG. 4B is a top-down view of an exemplary feed-through attach member having engagement features configured as latching arms.
FIG. 4C is a top-down view of an exemplary feed-through attach member having engagement features configured as notches.

The engagement features 15 may take many forms. Additionally, any number of engagement features may be provided. FIGS. 4A-4C depict three non-limiting examples of engagement features that may be provided on first and/or second feed-through attach member 14A, 14B. FIG. 4A depicts a first and/or second feed-through attach member 14A', 14B' having two engagement features 15' configured as angled tabs extending from first and second surfaces 13A', 13B' to a maximum distance d. The two engagement features 15' may be made of a material capable of deforming in an inward direction toward the center of the first and/or second feed-through attach member 14A', 14B' as the first and/or second feed-through attach member 14A', 14B' are inserted into an opening of a faceplate. When the two engagement features 15' clear the opening, they may return to their original shape such that the two engagement features 15' contact (or nearly contact) an inner surface of the faceplate (e.g., faceplate 24 illustrated in FIG. 2). The first and/or second feed-through attach members 14A', 14B' include a base portion 21' having a width w that is greater than a width of the opening (e.g., feed-through opening 26 illustrated in FIG. 2) into which the first and/or second feed-through attach members 14A', 14B' is inserted. In the illustrated embodiment, a gap 23' is present between the engagement features 15' and the base portion 21' such that portions of the faceplate are disposed within the gaps 23' when the first and/or second feed-through attach members 14A', 14B' is inserted in the feed-through opening. In this manner, the first and/or second feed-through attach members 14A', 14B' may be secured to a faceplate.

FIG. 4B depicts another embodiment of first and/or second feed-through attach members 14A", 14B" having engagement features 15" configured as arms 15" extending away from first and second surfaces 13A", 13B" (i.e., first and second arms). The arms 15" extend toward the optical cable 12 (i.e., in a direction opposite from an insertion direction). In the illustrated embodiment, the arms 15" are angled with respect to the first and second surface 13A", 13B" by a small angle θ to allow them to flex inwardly upon insertion into a feed-through opening of a faceplate. Ends of the arms 15" and a base portion 21" for gaps 23" therebetween. Once the arms 15" clear the faceplate, they return to their original position such that the faceplate is disposed within the gaps 23" between the arms 15" and the base portion 21", thereby securing the first and/or second feed-through attach members 14A", 14B" to the faceplate.

FIG. 4C depicts an embodiment wherein the engagement features 15''' are configured as notches 15'''. The body of the first and/or second feed-through attach members 14A''', 14B''' may be tapered such that a width of the first and/or second feed-through attach members 14A''', 14B''' is less at an insertion end 25A''' than a rear end 25B'''. Accordingly, the first and second sides 13A''', 13B''' of the first and/or second feed-through attach members 14A''', 14B''' deflect inwardly as the first and/or second feed-through attach members 14A''', 14B''' are inserted into a feed-through opening of a faceplate until the edges of the feed-through opening are disposed within the notches 15''' wherein they return to their original shape. The faceplate is disposed within the notches 15''', thereby maintaining the first and/or second feed-through attach members 14A''', 14B''' with respect to the faceplate.

The engagement features depicted in FIGS. 4A-4C are provided as examples and not limitations. In other embodiments, the first and second feed-through attach members may increase in width from an insertion end to the rear end such that the first and second feed-through attach members are maintained within the feed-through openings by an interference fit. In yet other embodiments, the first and second feed-through attach members may be coupled to the faceplates by a turn and lock motion, such as a quarter turn, for example. Further, although the first and second feed-through attach members are depicted as rectangular in shape, embodiments are not limited thereto. For example, the first and second feed-through attach members may be circular or elliptical in cross-section. Other shapes are also possible.

Figure 6:
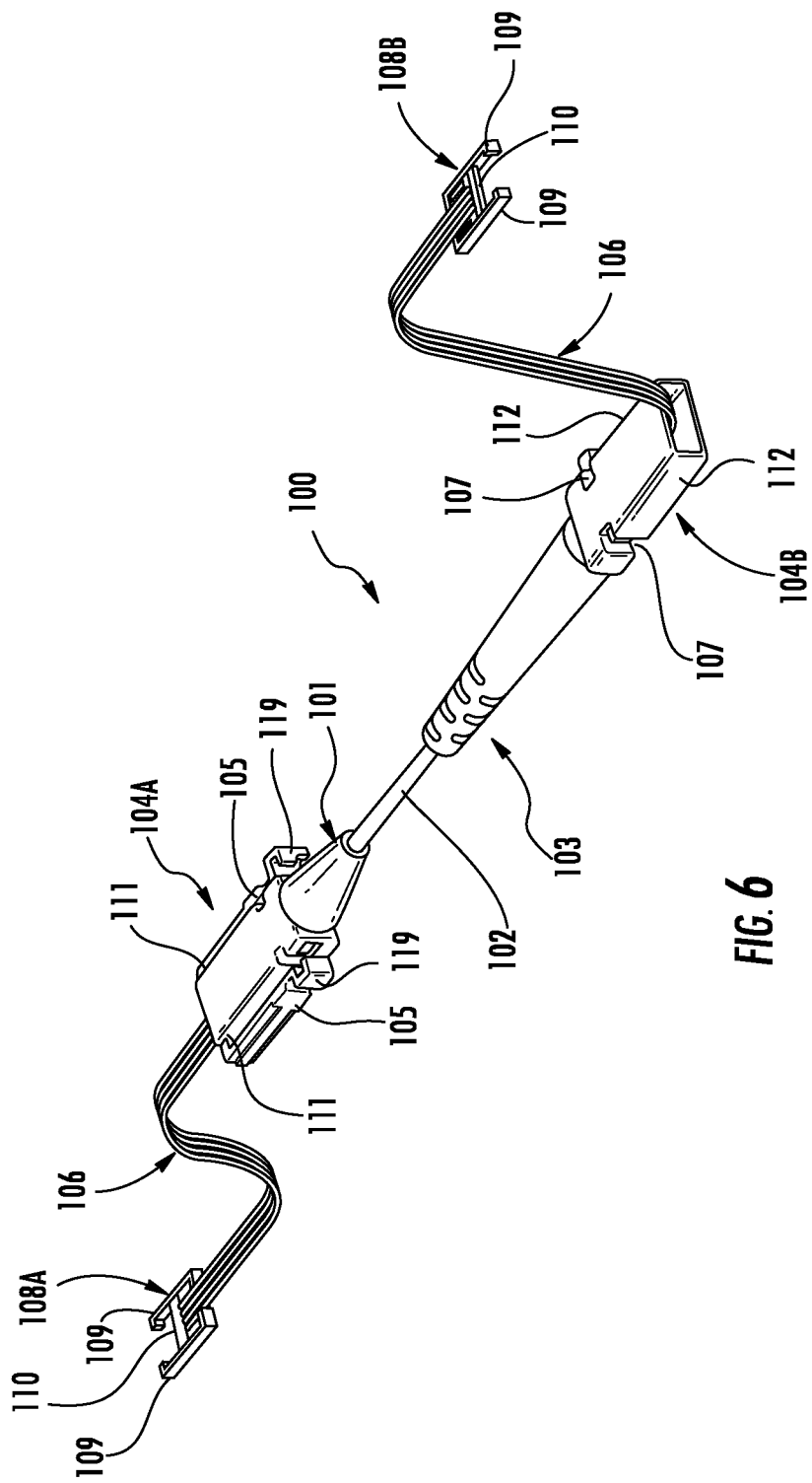
FIG. 6 is a perspective view of an exemplary feed-through optical cable assembly according to one or more embodiments described and illustrated herein.

Referring now to FIG. 5, an exemplary first optical connector 18A coupled to an exemplary first module connector 30 is schematically illustrated in cross-section. The embodiment depicted in FIG. 6 is for illustrative purposes only, and other configurations are possible. Any connector type may be used for the first or second module connectors 30, 50. It should be understood that the second module connector 50 may be the same as the first module depicted in FIG. 5, and that only the first module connector 30 is described below in the interest of brevity.

The first module connector 30 includes a receptacle opening 37 into which the first optical connector 18A may be disposed. In the illustrated embodiment, a mating face 19 of the first optical connector 18A contacts (or nearly contacts) a rear surface 39 of the receptacle opening 37. A fiber end 29 of the optical fiber 16 is proximate the mating face 19. In alternative embodiments, the first optical connector 18A is not inserted into a receptacle opening but rather butt-coupled against an exterior mating face of the first module connector 30. Other configurations are also possible.

The first module connector 30 may be coupled to a first surface 28 of a substrate 80, such as a circuit board. The first module connector 30 and the first surface 28 define a cavity 36 in which one or more active optical components 60 may be disposed on the first surface 28. Accordingly, in some embodiments the first module connector 30 encompasses the active optical component 60. The first module connector 30 further includes a surface 35 having a lens surface (e.g., a refractive lens element) formed therein. As described in more detail below, the lens surface 34 is operable to focus or otherwise condition optical signals of light between the active optical component 60 and the fiber end 29. It should be understood that any number of lens surfaces 34 may be provided depending on the number of active optical components 60 and optical fibers 16.

Generally, the first module connector 30 is configured to redirect optical signals of light emitted from the fiber end 29 of the optical fibers 16 toward lens surface, and redirect optical signals of light received from the lens surface 34 into the optical fiber 16. The first module connector 30 is fabricated from a material that is transmissive to light having a predetermined wavelength λ according to the particular optical communication protocol, such as an IR wavelength λ in the range of 800 nm to 1,100 nm, which is the wavelength range of VCSELs used in forming optical data links. As used herein, transmissive means that optical signals are able to pass through the material without significant losses. Other predetermined wavelengths λ may be used, such as wavelengths in the visible spectrum, for example.

In an example embodiment, the first module connector 30 is formed from a transparent resin such as Polyetherimide (PEI) sold by the General Electric Company under the trademarked name ULTEM® 1010, which has a refractive index of about n=1.64 in the aforementioned IR wavelength range. In an example, the first module connector 30 is monolithic and is formed, for example, by molding, by machining or by a combination of both molding and machining.

The illustrated first module connector 30 further includes an angled wall 32 and a void 33. The angled wall 32 and the void 33 provide an air-body interface that allows for the angled wall 32 to serve as a substantially 90° TIR mirror for reflecting optical signals of light as described in detail below. The angled wall 32 is referred to hereinafter as TIR surface 32. The material of the first module connector 30 has a refractive index n sufficiently large to provide nominally 90° total-internal reflection at the TIR surface 32. Simply stated, the TIR surface 32 provides an interface between the material of the angled wall 32 and air within the void (or other material within the void 33) having different indices of refraction for turning the optical signal within the first module connector 30.

Accordingly, the first module connector 30 (as well as the second module connector 50) may provide a turned optical path OP to optically couple the optical fibers 16 to active optical components 60. More specifically, an optical signal emitted from a fiber end 29 of an optical fiber 16 within the first optical connector 18A propagates through the bulk of the first module connector 30 and is then reflected by the TIR surface 32. The optical signal continues traveling through the bulk of the first module connector 30 until it is focused by the lens surface 34 such that it is received by the active optical component 60, which may be a photodiode. Similarly, the active optical component 60 may emit an optical signal that is received and focused by the lens surface 34 such that it is received by the TIR surface 32. The TIR surface 32 redirects the optical signal where it propagates through the bulk of the first module connector 30 and is received by the fiber end 29 of the optical fiber 16.

Although the first and second module connectors 30 and 50 are described as having turned optical paths OP, embodiments are not limited thereto. For example, the first and second module connectors 30 and 50 may be configured as having an in-line optical path without an optical turn. Accordingly, embodiments are not limited to module connectors having a TIR surface.

Referring now to FIG. 6, an exemplary feed-through optical cable assembly 100 is depicted. The illustrated feed-through optical cable assembly 100 generally includes an optical cable 102 having a plurality of optical fibers 106, a first feed-through attach member 104A coupled to a first end of the optical cable 102, and a second feed-through attach member 104B coupled to a second end of the optical cable 102. In the illustrated embodiment, a first strain relief element 101 is provided at the first feed-through attach member 104A and a second strain relief element 103 is provided at the second feed-through attach member 104B. However, such strain relief elements may be omitted in other embodiments.

The optical cable 102 includes a jacket or outer covering that surrounds the plurality of optical fibers 106. The plurality optical fibers 106 pass through the first and second feed-through attach members 104A, 104B and terminate at a first optical connector 108A and a second connector 108B. The plurality of optical fibers 106 passes through the first and second feed-through attach members 104A, 104B without interruption, i.e., no optical connectors are provided within the first and second feed-through attach members 104A, 104B. In the illustrated embodiment, the plurality of optical fibers 106 are configured as eight ribbonized optical fibers. However, any number of optical fibers may be utilized depending on the application, and the optical fibers 106 do not need to be ribbonized.

The first and second feed-through attach members 104A, 104B are configured to be disposed within a faceplate of a module, such as a module within a datacenter. In the illustrated embodiment, the first and second feed-through attach members 104A, 104B have different configurations. However, in other embodiments, the first and second feed-through attach members 104A, 104B may have the same configuration (i.e., identical parts). The configuration of the feed-through attach members may depend on the type of module to which they are to be coupled. As described above, the first and second feed-through attach members 104A, 104B are shaped to be disposed within feed-through openings of a faceplate of a module. Additionally, the first and second feed-through attach members 104A, 104B include engagement features to securely fasten the first and second feed-through attach members 104A, 104B to the respective faceplates.

The first feed-through attach member 104A includes two first engagement features configured as latching arms 105 extending from side surfaces 111. The latching arms 105 are pliable such that they bend inwardly as the first feed-through attach member 104A is inserted into a faceplate, as described in more detail below with reference to FIG. 10. The first feed-through attach member 104A further includes a rear portion 119 that is configured to contact the faceplate such that faceplate is disposed between the latching arms 105 and the rear portion 119 when the first feed-through attach member 104A is fully positioned within a feed-through opening of the faceplate (see FIG. 10).

The second feed-through attach member 104B also includes two second engagement features positioned on side surface 112. The two engagement features of the second feed-through attach member 104B are configured as notches 107 that provide a snap-fit with respect to a feed-through opening of a faceplate, or a feed-through receptacle disposed in the faceplate. As described above with respect to FIG. 4C, the side surface 112 of the second feed-through attach member 104B may be pushed inwardly by the edges of the feed-through opening as the second feed-through attach member 104B is inserted into the feed-through opening. Accordingly, a width of the second feed-through attach member 104B may be slightly larger than a width of the feed-through attach member. The side surfaces then return to their normal shape and position when the faceplate is disposed within the notches 107 such that the second feed-through attach member 104B snaps into place.

Figure 7:
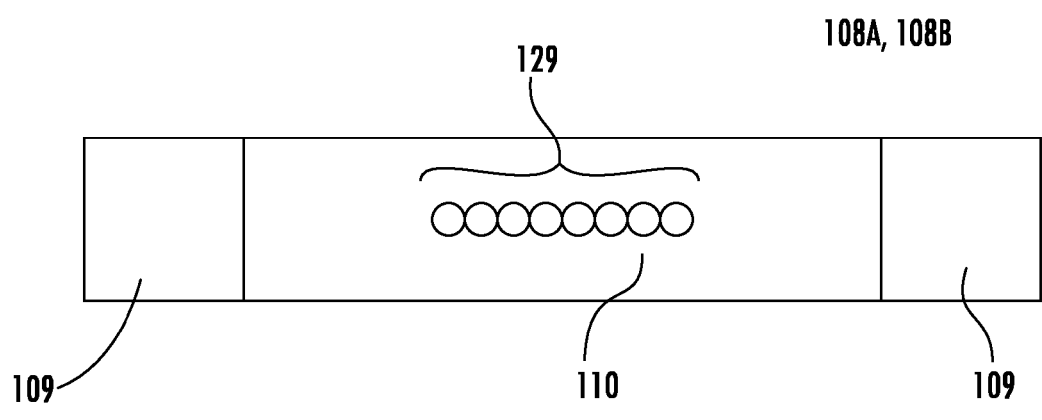
FIG. 7 is a front view of an exemplary optical connector of the feed-through optical cable assembly depicted in FIG. 6.

The first and second optical connectors 108A, 108B may be any connector configured to mate with a module connector disposed on a circuit board within a module. Embodiments are not limited to the first and second optical connectors 108A, 108B depicted in FIG. 6, and may take on other configurations. In the illustrated embodiment, the first and second optical connectors 108A, 108B comprise arms 109 that extend from opposing sides of a mating face 110. As described in more detail with respect to FIG. 11, the arms 109 are configured to engage corresponding features of the module connectors located on the circuit board. As shown in FIG. 7, which is a front view of a first or second optical connector 108A, 108B, the fiber ends 129 of the optical fibers 106 are exposed at the mating face 110. In other embodiments, waveguides or other optical components such as fiber stubs or gradient-index lenses may be coupled to the fiber ends 129 and exposed at the mating face 110.

Figure 8:
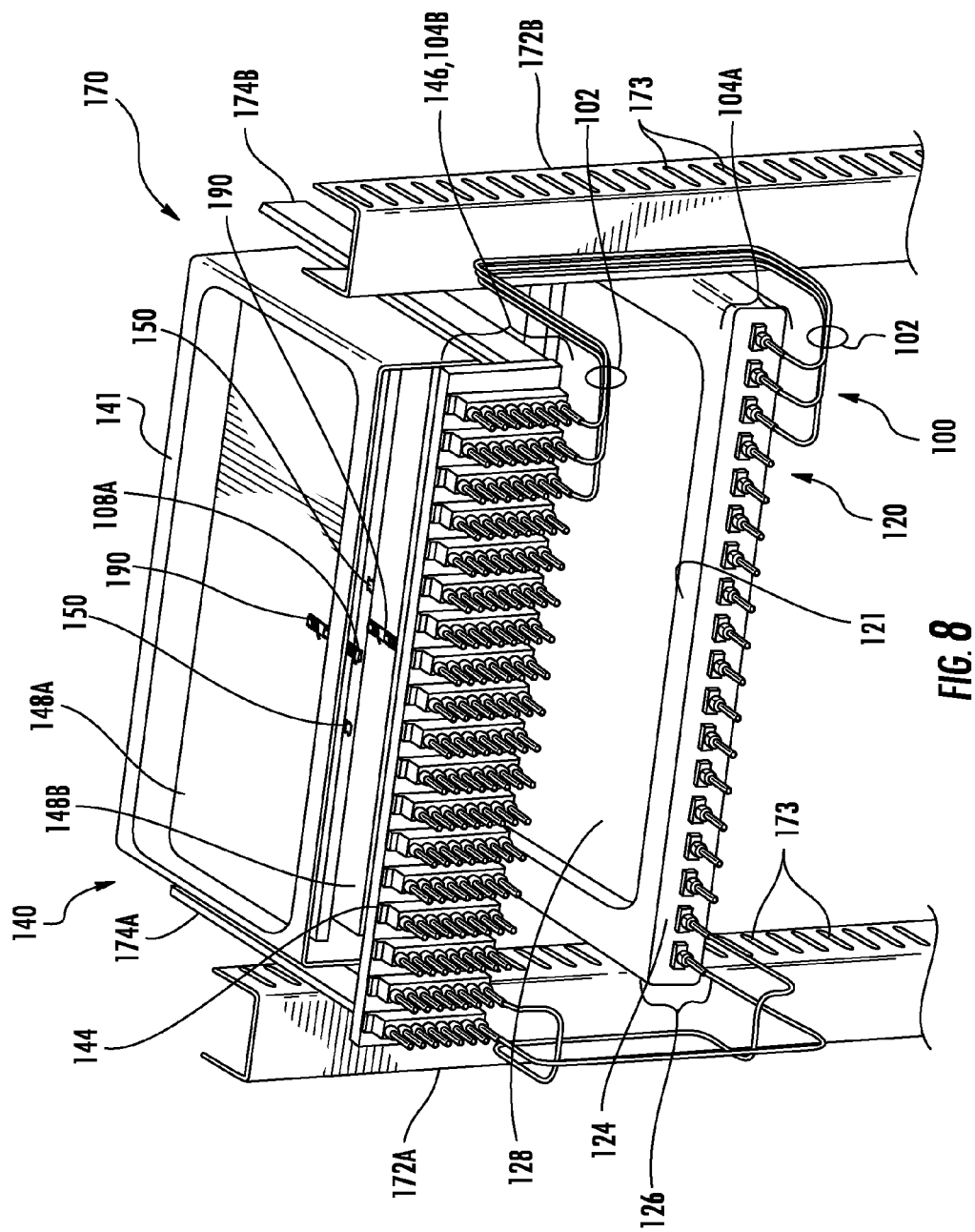
FIG. 8 is a perspective view of an exemplary datacenter enclosure comprising a first module and a second module optically coupled by feed-through optical cable assemblies according to one or more embodiments described and illustrated herein.

Referring now to FIG. 8, exemplary first and second modules 120, 140 of an exemplary datacenter enclosure 170 are schematically illustrated. It should be understood that the arrangement of the datacenter enclosure 170 are for illustrative purposes only, and that many other arrangements are possible. Generally, the datacenter enclosure 170 may be configured as a rack system to accept rack-based modules (e.g., first and second modules 120, 140). The illustrated datacenter enclosure 170 includes first and second support frames 172A, 172B, which provide slots for receiving the first and second modules 120, 140. The first and second modules 120, 140 are supported by the first and second support frames 172A, 172B. The first module 120 is depicted as a server module, while the second module 140 is depicted as a router module. The first module 120 and the second module 140 are optically coupled by a plurality of feed-through optical cable assemblies 100. It is noted that the optical cables 102 of several of the feed-through optical cable assemblies 100 are not shown to more clearly depict the components of the exemplary datacenter enclosure 170. In practice, each feed-through optical cable assembly 100 includes an optical cable 102.

Figure 9:
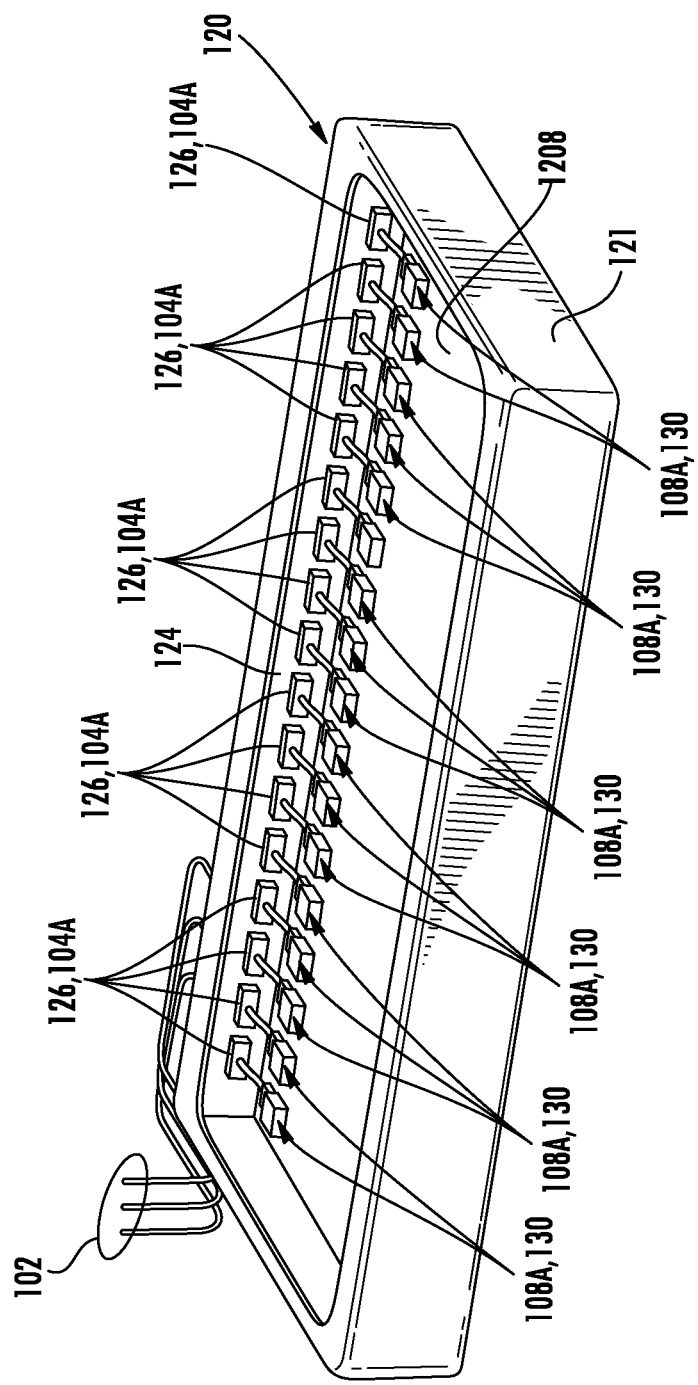
FIG. 9 is a rear perspective view of the exemplary first module depicted in FIG. 8 and a plurality of feed-through optical cable assemblies coupled thereto according to one or more embodiments described and illustrated herein.

The first module 120 includes a housing 121 that supports a circuit board 128. As an example and not a limitation, the housing 121 may be configured as a 1U compatible rack. Although not shown, various electrical components that provide the functionality of the first module (e.g., the functionality of the server device) are coupled to a surface of the circuit board 128. The housing 121 further includes a faceplate 124 having a plurality of feed-through openings 126 configured to securely receive a plurality of first feed-through attach members 104A (or, alternatively, a plurality of second feed-through attach members 104B). FIG. 9 depicts a rear perspective view of the first module 120 depicted in FIG. 8. As shown in FIG. 9, the circuit board 128 supports a plurality of first module connectors 130 operable to receive first optical connectors 108A.

The first feed-through attach members 104A are positioned within the feed-through openings 126 of the faceplate 124 such that the latching arms 105 secure the first feed-through attach members 104A to the faceplate 124 as described above. The optical fibers 106 therefore pass through the faceplate 124 without intermediate optical connections, thereby minimizing loss of the optical signals.

The second module 140 includes a housing 141 that supports at least two circuit boards 148A, 148B; however, any number of circuit boards may be provided. As an example and not a limitation, the housing 141 may be configured as a 2U compatible rack. The housing 141 of the illustrated second module 140 provides for an open front face. A faceplate 144 that is offset from the housing 141 is provided. However, in other embodiments, the faceplate 144 may be a component of the housing 141. In some embodiments, the faceplate 144 may be rotatably coupled to the housing 141 (or other component) so that it may be pivoted to provide access to the circuit boards 148A, 148B within the housing.

The faceplate 144 of the illustrated embodiment includes a plurality of feed-through receptacles 146 that are configured to securely receive the second feed-through attach member 104B. Alternatively, the faceplate 144 may not include the plurality of feed-through receptacles 146 but rather include feed-through openings as described above such that the second feed-through attach members 104B are coupled directly to the faceplate 144. The second feed-through attach members 104B allow the optical fibers 106 to pass through the faceplate 144 without intermediate optical connections, thereby minimizing loss of the optical signals. Accordingly, the plurality of feed-through optical cable assemblies 100 optical couple the first module 120 to the second module 140 using only two optical connections: one at the circuit board 128 of the first module and one at the circuit board 148A, 148B of the second module 140.

Figure 10:
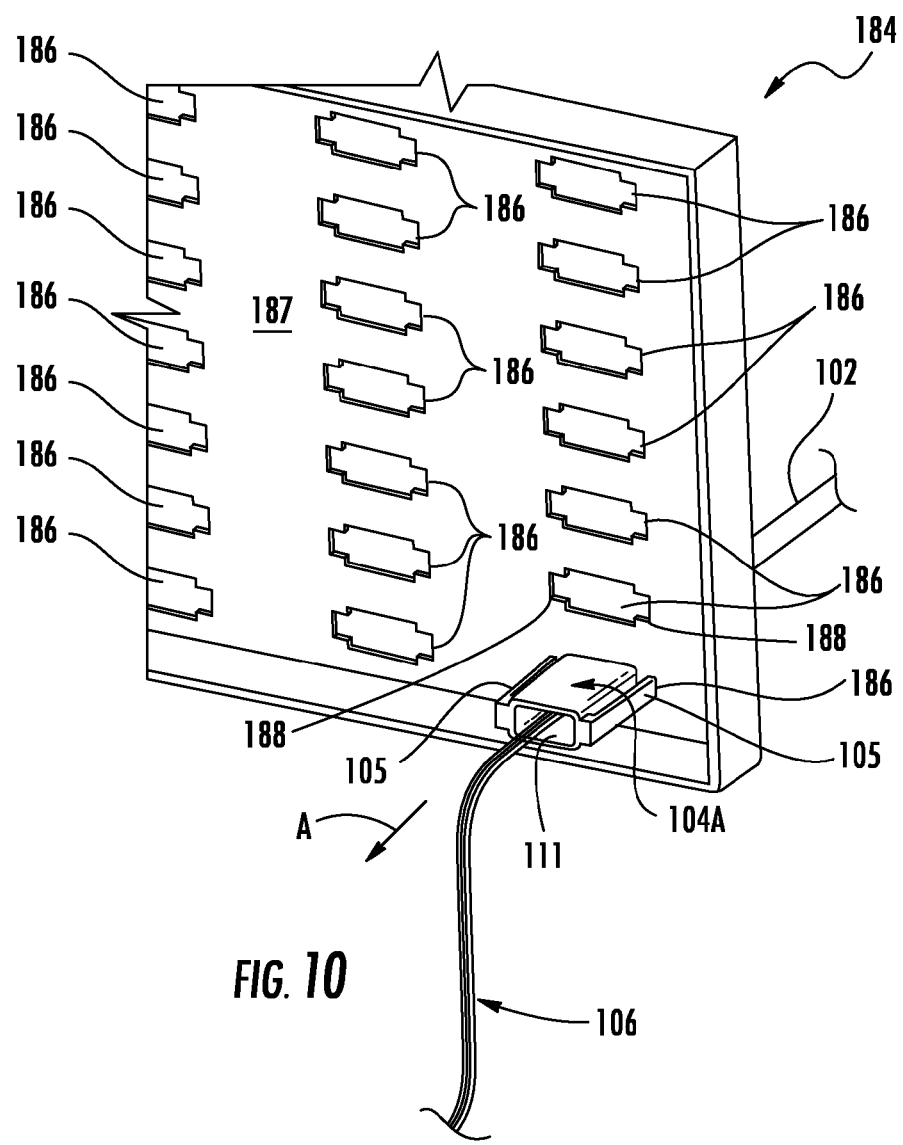
FIG. 10 is a rear perspective view of an exemplary faceplate of a module and a feed-through attach member of a feed-through optical cable disposed within a feed-through opening of the faceplate according to one or more embodiments described and illustrated herein.

FIG. 10 depicts an internal surface 187 of an exemplary faceplate 184 that may be a component of the first and/or second modules 120, 140. The illustrated faceplate 184 includes a plurality of feed-through openings 186 that are configured to accept a plurality of first feed-through attach members 104A. The feed-through openings 186 include opposing notches 188 that are sized to receive the latching arms 105 of the first feed-through attach members 104A (i.e., first and second notches). To connect a first feed-through attach member 104A to the faceplate 184, the first optical connector 108A is passed through one of the feed-through openings 186. The first feed-through attach member 104A is inserted into the feed-through opening 186 as indicated by arrow A. The latching arms 105 are then bent inwardly against the faceplate as the first feed-through attach member 104A is inserted. When the latching arms 105 clear the internal surface 187 of the faceplate 184, they return to their original position to engage the first feed-through attach member 104A with respect to the faceplate 184.

Figure 11:
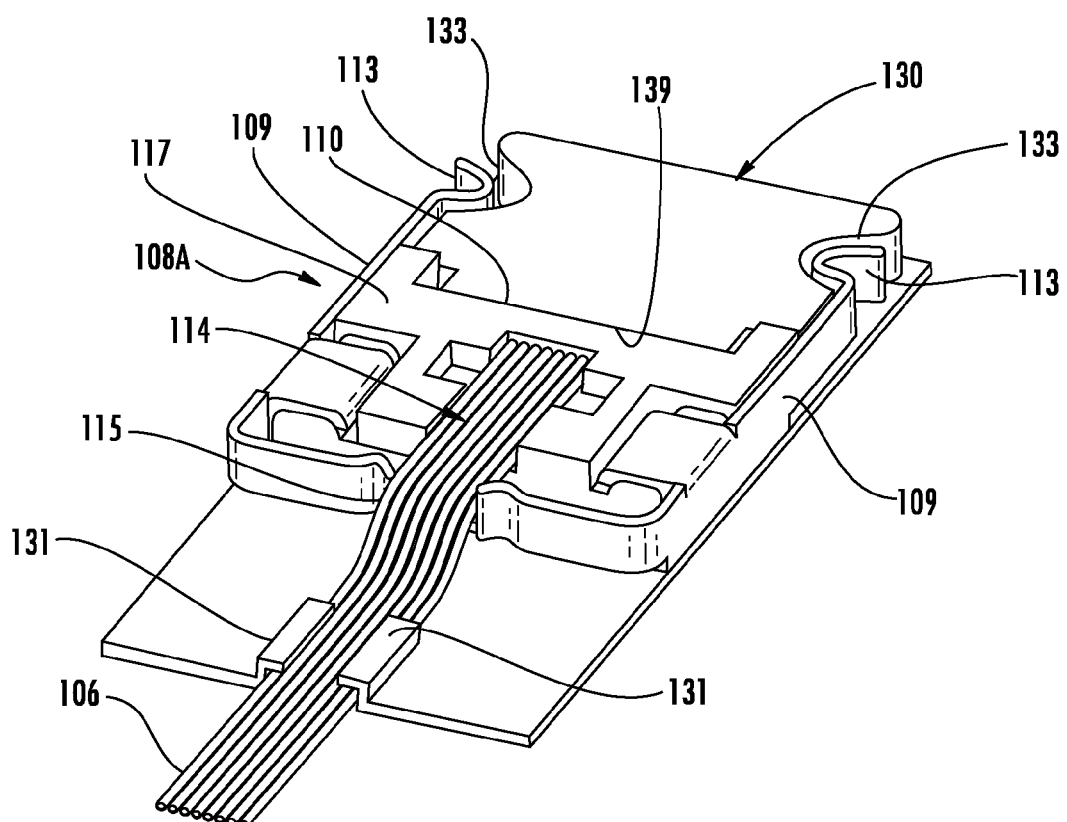
FIG. 11 is a perspective view of the optical connector depicted in FIG. 6 coupled to an exemplary module connector of a module within a datacenter enclosure according to one or more embodiments described and illustrated herein.

The first and second optical connectors 108A, 108B are connected to first and second module connectors 130, 150 positioned on the circuit boards of the respective first and second modules 120, 140. For example, the first and second module connectors 130, 150 may be positioned near the edges of the respective circuit boards. FIG. 11 is a perspective view of an exemplary first optical connector 108A coupled to a first module connector 130 that may be disposed on a circuit board 128 as shown in FIG. 9. It is noted that the second module connector 150 may be configured as the first module connector 130 depicted in FIG. 11 and described below.

The first optical connector 108A includes a body 117 that maintains the plurality of optical fibers 106. It is noted that the second optical connector 108B may be the same as the first optical connector 108A. The plurality of optical fibers 106 may pass through an opening 114 in the body 117. The fiber ends (not shown in FIG. 11) of the plurality of optical fibers 106 may be stripped of any external coating and disposed in the body 117 proximate the mating face 110 such that the fiber ends are exposed at the mating face 110 as shown in FIG. 7. In some embodiments, the plurality of optical fibers 106 may be secured to the body 117 of the first optical connector 108A with an adhesive, such as a UV curable adhesive.

The first optical connector 108A includes arms 109 extending from the body 117 or coupled to the body 117. The arms 109 terminate in a detent portion 113 for engaging the first module connector 130 as described below. The arms 109 may be an integral component with the body 117 or a separate component(s). The arms 109 may be fabricated from a compliant material, such as steel, other metals, or thermoplastic, for example. The first optical connector 108A may also include an optical fiber guide portion 115 provided to place the plurality of optical fibers 106 at a desired location with respect to the body 117. In some embodiments, clips 131 may be provided on a surface 135 to hold down the plurality of optical fibers 106.

The first module connector 130 (as well as the second module connector) may provide a TIR surface as described above and illustrated in FIG. 5. Accordingly, the first module connector 130 turns the optical signals of light to and from active optical components disposed on the circuit board and associated with the first module connector 130.

The first module connector 130 includes two mating features 133 that receive the detent portion 113 of the respective arms 109 of the first optical connector 108A when the first optical connector 108A is mated to the first module connector 130. The mating face 110 of the first optical connector 108A may contact a mating face 139 of the first module connector 130. Optical signals may then pass through the interface of the respective mating faces 110, 139.

Referring once again to FIG. 9, the first module connectors 130 may be positioned proximate to an edge 127 of the circuit board 128. Similarly, the second module connectors 150 may be positioned proximate an edge 147 of the circuit board (e.g., first or second circuit board 148A, 148B).

Figure 12:
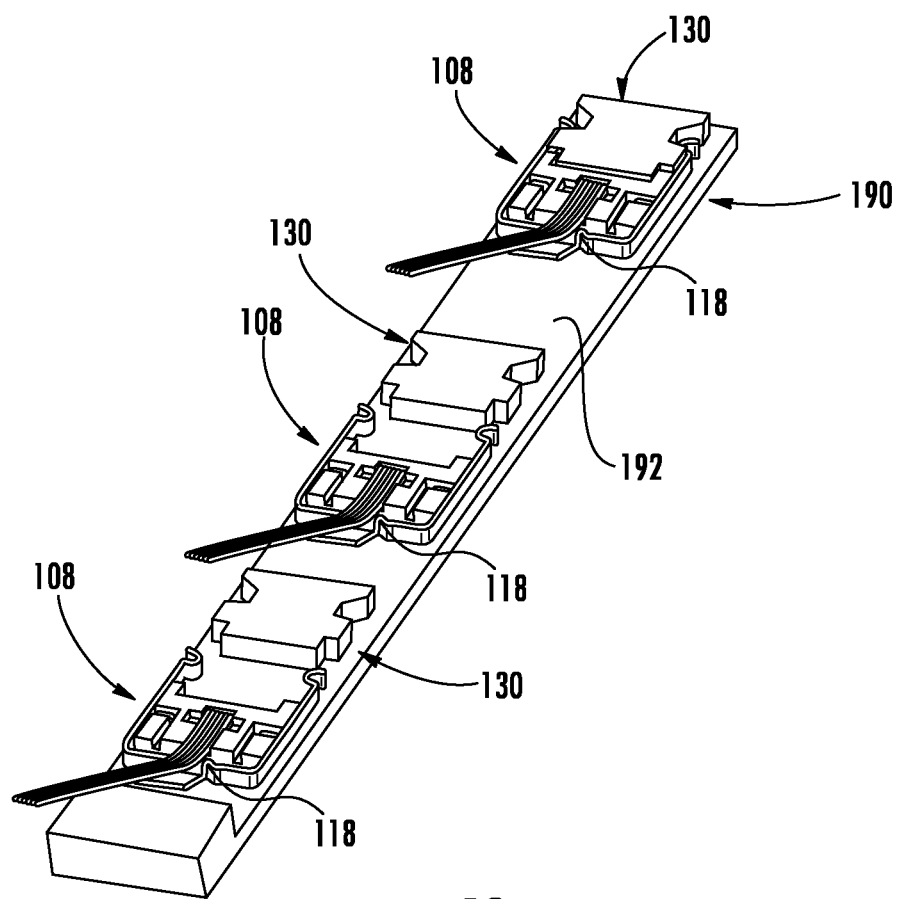
FIG. 12 is a perspective view of a module connector assembly comprising three module connectors, and three optical connectors for mating to the three module connectors according to one or more embodiments described and illustrated herein.

For high capacity applications, the module connectors may be arranged in linear succession perpendicular to the edge of the circuit board. Referring now to FIG. 12, a module connector assembly 190 is depicted. The module connector assembly 190 includes several module connectors 130 linearly arranged on a common platform 192. Three module connectors 130 are provided on the module connector assembly 190 depicted in FIG. 12; however, any number of module connectors 130 may be provided.

FIG. 12 depicts one optical connector 108 in a coupled relationship with a module connector 130, and two additional optical connectors 108 in a decoupled relationship with two module connectors 130. The optical connectors 108 depicted in FIG. 12 have an optical fiber guide portion 118 that provide off-axis routing of the plurality of optical fibers 106 (i.e., the plurality of fibers are non-orthogonal with the mating face 110 of the optical connector 108 prior to entry into the optical connector 108). As shown in FIG. 8, the module connector assembly 190 may be positioned proximate to an edge of the circuit board to provide for several connectors to be connected to the circuit board in a small area.

The feed-through optical cable assemblies may be cut to length during field installation, thereby minimizing excess fiber length within the datacenter enclosure. For example, after the feed-through attach members are coupled to the respective faceplates, the plurality of optical fibers may be cut to length by a laser-cleaving process that utilizes a hand-held $CO_2$ laser cleaving device (or other). As an example and not a limitation, the fiber ends may be cut at an angle. The cleaved ends may then be secured to the connector and then coupled to the appropriate module connector within a module of the datacenter enclosure.

It should now be understood that embodiments of the present disclosure are directed to feed-through optical cable assemblies and datacenter connection systems having feed-through attach members. The feed-through attach members allow for optical fibers to be passed through faceplates of modules within the datacenter enclosure without requiring optical connectors into and out of the faceplates. Accordingly, embodiments of the present disclosure provide for datacenter connection systems that reduce the total number of optical connectors required to connect modules within the datacenter enclosure, and therefore reduce the loss of optical signals between connected modules.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance may occur to persons skilled in the art, the application should be construed to include everything within the scope of the appended claims and their equivalents.

What is claimed is:

1. A datacenter connection system comprising:
a first module comprising a first faceplate having at least one first feed-through opening, a first surface, and at least one first module connector disposed on the first surface, wherein the at least one first feed-through opening has a first side having a first notch, a second side having a second notch, a third side, and a fourth side;
a feed-through optical cable assembly comprising:
an optical cable comprising at least one optical fiber;
a first feed-through attach member coupled to the optical cable, wherein the at least one optical fiber passes through the first feed-through attach member without interruption, and the first feed-through attach member is disposed within the at least one first feed-through opening such that a first, second, third and fourth surface of the first feed-through attach member contacts the first, second, third, and fourth sides of the at least one first feed-through opening, respectively, and the at least one optical fiber passes through the faceplate without an optical connection at the faceplate; and
a first optical connector coupled to a first end portion of the at least one optical fiber such that the at least one fiber terminates at a mating face of the first optical connector, wherein the first optical connector is coupled to the at least one first module connector.

2. The datacenter connection system of claim 1, further comprising at least one active optical component associated with the at least one first module connector, wherein the at least one first module connector and the first optical connector of the feed-through optical cable assembly optically couple the at least one optical fiber to the at least one active optical component.

3. The datacenter connection system of claim 1, wherein the at least one first module connector is located at an edge of the first surface.

4. The datacenter connection system of claim 1, wherein:
the first feed-through attach member comprises at least one engagement feature; and
the at least one engagement feature engages the first faceplate such that the first feed-through attach member is maintained within the at least one first feed-through opening.

5. The datacenter connection system of claim 4, wherein the at least one engagement feature comprises a first latching arm extending from a first side of the first feed-through attach member and a second latching arm extending from a second side of the first feed-through attach member.

6. The datacenter connection system of claim 5, wherein the first latching arm passes through the first notch of the at least one feed-through opening and the second latching arm passes through the second notch of the at least one feed-through opening.

7. The datacenter connection system of claim 1, wherein the first feed-through attach member comprises a first half portion, a second half portion, and a hinge portion disposed between the first half portion and the second half portion.

8. The datacenter connection system of claim 1, wherein the first optical connector comprises a mating face, and a fiber end of the at least one optical fiber is flush with the mating face.

9. The datacenter connection system of claim 1, wherein:
the first optical connector comprises a first arm and a second arm; and
the at least one first module connector comprises a first mating feature configured to receive the first arm and a second mating feature configured to receive the second arm.

10. The datacenter connection system of claim 1, wherein the at least one first module connector comprises a total internal reflection surface.

11. The datacenter connection system of claim 1, wherein the at least one first module connector comprises a plurality of first module connectors linearly arranged on the first surface of the first module.

12. The datacenter connection system of claim 11, wherein individual first module connectors of the plurality of first module connectors are linearly arranged in a direction perpendicular to an edge of the first surface.

13. The datacenter connection system of claim 11, wherein the first optical connector comprises a fiber guide portion through which the at least one optical fiber is disposed such that the at least one optical fiber enters the first optical connector non-orthogonally with respect to a mating face of the first optical connector.

14. The datacenter connection system of claim 11, further comprising a second module comprising a second faceplate comprising at least one second feed-through opening, a second surface, and at least one second module connector disposed on the second surface, wherein the feed-through optical cable assembly further comprises:
a second feed-through attach member coupled to the optical cable, wherein the at least one optical fiber passes through the second feed-through attach member, and the second feed-through attach member is disposed within the at least one second feed-through opening; and
a second optical connector coupled to a second end portion of the at least one optical fiber, wherein the second optical connector is coupled to the at least one second module connector.

15. A datacenter connection system comprising:
a first module comprising a first faceplate having at least one first feed-through opening, a first surface, and at least one first module connector disposed on the first surface;
a second module comprising a second faceplate having at least one second feed-through opening, a second surface, and at least one second module connector disposed on the second surface, wherein the at least one first feed-through opening and the at least one second feed-through opening has a first side having a first notch, a second side having a second notch, a third side, and a fourth side; and
a feed-through optical cable assembly comprising:
an optical cable comprising at least one optical fiber, the fiber having a first end and a second end;
a first feed-through attach member comprising a first engagement feature and a second engagement feature, wherein:
the at least one optical fiber passes through the first feed-through attach member without interruption; and
the first feed-through attach member is maintained within the at least one first feed-through opening such that a first, second, third and fourth surface of the first feed-through attach member contacts the first, second, third, and fourth sides of the at least one first feed-through opening, respectively, and the at least one optical fiber passes through the first faceplate without an optical connection at the first faceplate; and
a second feed-through attach member comprising a first engagement feature and a second engagement feature, wherein:
the at least one optical fiber passes through the second feed-through attach member without interruption; and
the second feed-through attach member is maintained within the at least one second feed-through opening such that a first, second, third and fourth surface of the second feed-through attach member contacts the first, second, third, and fourth sides of the at least one second feed-through opening, respectively, and the at least one fiber passes through the second faceplate without and optical connection at the second faceplate;
a first optical connector comprising a first mating face, wherein the first optical connector is coupled to the first end the at least one optical fiber such that the first fiber end of the at least one optical fiber is positioned at the first mating face; and
a second optical connector comprising a second mating face, wherein the second optical connector is coupled to the second end the at least one optical fiber such that the second fiber end of the at least one optical fiber is positioned at the second mating face.

16. The datacenter connection system of claim 15, wherein each of the first feed-through attach member and the second feed-through attach member comprises a first half portion, a second half portion, and a hinge portion disposed between the first half portion and the second half portion.

17. The datacenter connection system of claim 15, wherein:
the at least one first engagement feature comprises a first latching arm extending from a first side of the first feed-through attach member and a second latching arm extending from a second side of the first feed-through attach member;
the first latching arm and the second latching arm of the first feed-through attach member are disposed in the first notch and the second notch of the first feed-through opening, respectively;
the at least one second engagement feature comprises a third latching arm extending from a first side of the second feed-through attach member and a fourth latching arm extending from a second side of the second feed-through attach member; and
the first latching arm and the second latching arm of the second feed-through attach member are disposed in the first notch and the second notch of the second feed-through opening, respectively.

18. The datacenter connection system of claim 15, wherein each of the first optical connector and the second optical connector comprises a first arm and a second arm.

19. The datacenter connection system of claim 15, wherein the at least one first module connector comprises a total internal reflection surface.

20. The datacenter connection system of claim 15, wherein:
the at least one first module connector comprises a plurality of first module connectors linearly arranged on the first surface of the first module; and
the at least one second module connector comprises a plurality of second module connectors linearly arranged on the second surface of the second module.

* * * * *